Oct. 5, 1937.　　　A. H. HOWELL　　　2,095,032
APPARATUS FOR SHAVING CURVED STEREOTYPE PLATES
Filed June 1, 1934　　　2 Sheets-Sheet 1

Inventor.
Aaron Henry Howell
By attorneys

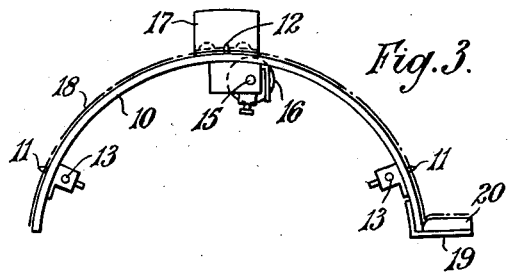
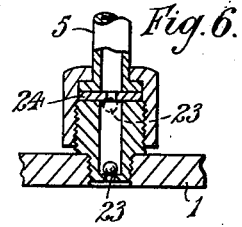
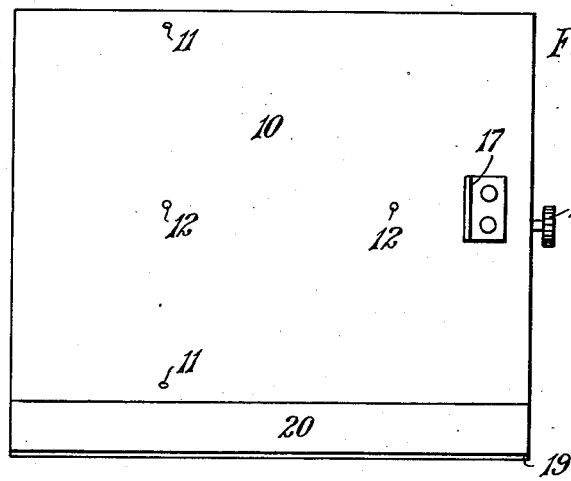
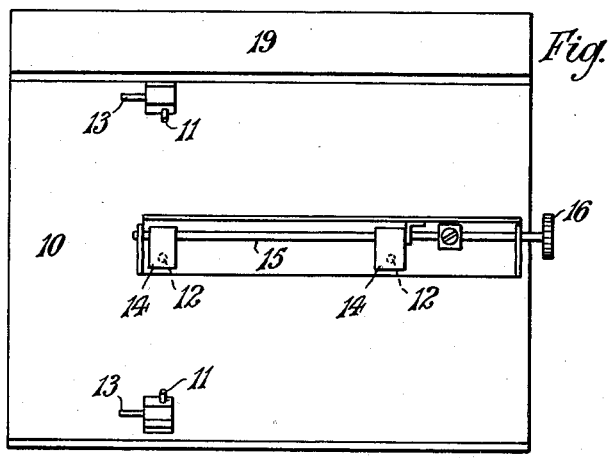

Patented Oct. 5, 1937

2,095,032

UNITED STATES PATENT OFFICE 2,095,032

APPARATUS FOR SHAVING CURVED STEREOTYPE PLATES

Aaron Henry Howell, Wimbledon, London, England, assignor, by mesne assignments, to Wood Newspaper Machinery Corporation, New York, N. Y., a corporation of Virginia Application June 1, 1934, Serial No. 728,570
In Great Britain June 2, 1933

12 Claims. (Cl. 29—21)

This invention relates to apparatus for shaving curved stereotype plates, and more particularly to improved means for ensuring accurate shaving of the concave surfaces of plates which are formed in known manner with printing areas on their convex faces at levels varying to accord with varying depths of impression desired to be produced from the respective areas.

When such a plate is held against the inner face of a boring arch the slight irregularities in its printing surface are liable to throw the inner surface which is to be shaved out of concentricity with the shaving tool rotated within the arch, and in order to correct the inaccuracy thus produced, considerable time has to be expended in the application of make-ready to the printing cylinder on which the plate is subsequently used.

To minimize this disadvantage it has heretofore been proposed to interpose between the plates and the arch an overlay of resilient material adapted to yield to the high parts of the plate, or an overlay in which the high and low parts of the plate are reproduced in reverse or in the form of a so-called boring mask or cut overlay having parts cut away corresponding to the high parts of the plate.

In the use of these overlays it has heretofore been necessary to insert them into and withdraw them from the arch simultaneously with the insertion and withdrawal of each plate—an operation which is attended by considerable difficulty, especially when the plates have to be inserted into and withdrawn from the arch while hot and when a plurality of identical plates have to be shaved in succession.

In order to overcome these disadvantages, it is proposed, according to the present invention, to support an overlay within the arch independently of the plate to be shaved, so that it may remain in operative position within the arch during the casting of any number of plates to which its form is adapted.

According to the preferred arrangement for carrying out the invention, the shaving arch is provided with orifices extending through its crown, and these orifices communicate at the exterior of the arch with pipes of an air suction system whereby the overlay is held in position within the arch by suction.

In carrying out the invention the overlay may be positioned within the arch in accurate registration with the plates by inserting it into the arch with the first plate. Alternatively, where this method cannot be conveniently adopted (for example when a boring mask is used in conjunction with hot plates), a dummy plate may be employed to which the overlay or mask is first releasably secured in correct position by means of registering devices or marks applied to the dummy plate and to the overlay, the dummy plate with the overlay attached is inserted within the arch in a position corresponding to that occupied by the plates to be shaved, the overlay secured to the arch and released from the dummy plate, whereupon the latter is removed from the arch, leaving the overlay or mask supported in correct position within the arch.

The accompanying drawings illustrate one constructional form of apparatus for carrying out the invention. In the said drawings:—

Figure 3 is an end elevation of a dummy plate, as viewed from the left of Figure 4;

Figures 4 and 5 are respectively a plan and underside view of the dummy plate shown in Figure 3, and Figure 6 is a sectional view, on an enlarged scale, of a detail.

Figure 1:
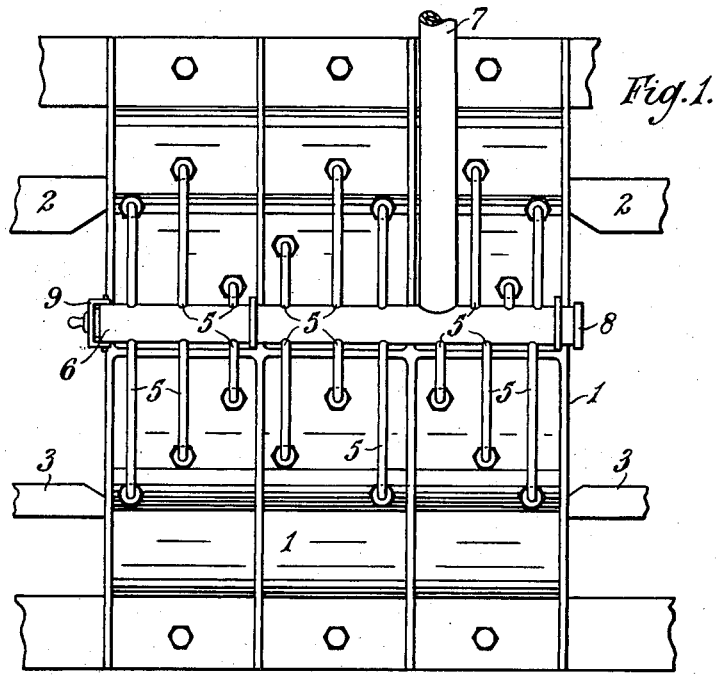
Figure 1 is a plan view of the shaving arch showing adjacent portions of the machine frame and plate supporting rails.
Figure 2:
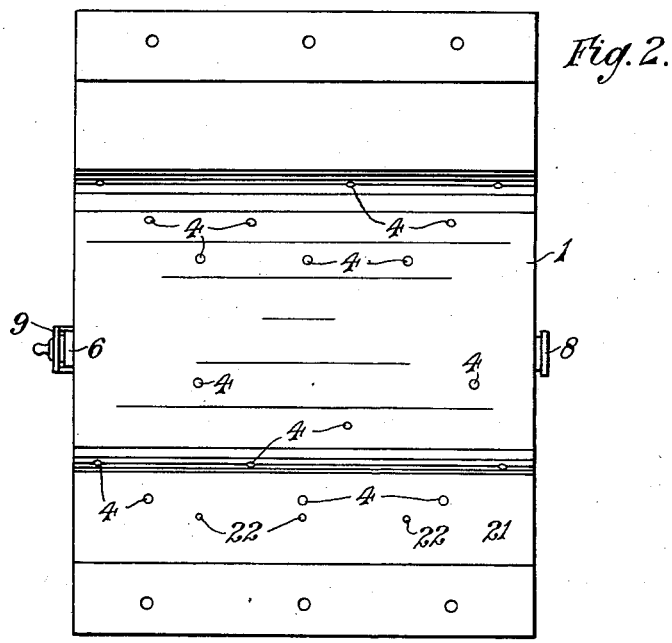
Figure 2 is an underside view of the shaving arch.

As is well known in machines of this construction, a plate to be shaved in the arch 1 is pushed into the arch along rails 2, 3, and lifted into contact with the under surface of the arch 1, while resting on movable sections of the said rails into position for the shaving operation.

For the purposes of the present invention the crown of the arch 1 is provided with a number of holes 4 extending through its crown and each connected at the exterior of the arch with a branch pipe 5 of an air suction system, which may conveniently comprise a main pipe 6 with which all the branch pipes 5 communicate, and which is connected by a pipe 7 with an air pump (not shown).

In this constructional form of apparatus, the main pipe 6 is closed at one end by a fixed plug 8 and at the opposite end by a hinged valve 9, which latter enables the system to be conveniently opened to atmosphere when required.

When an overlay is to be inserted in the arch with the first plate to be shaved, it is placed in correct position on the plate while the latter is supported on the rails 2, 3, pushed into and raised within the arch in the usual way, the valve 9 being opened during the position of the plate within the arch and then closed so as to retain the overlay in proper position against the inner surface of the arch in readiness for the next plate to be shaved when the first plate is removed. After shaving of all the plates for which that particular overlay is to be employed, the valve 9 is opened to permit the overlay to fall away from the inner surface of the arch by gravity for removal by hand.

Referring now to Figures 3, 4, and 5, the dummy plate 10 there shown for positioning an overlay within the arch preparatory to the shaving of a series of cast plates substantially corresponds in form with the plates to be shaved, and is provided with retractible pins 11, 12, which extend through the plate 10 and serve both as registering points for positioning the overlay on the dummy plate and for releasably securing the overlay thereto.

In the arrangement shown, there are two edge pins 11 which are projected through the plate by means of cam plungers 13, and two centre pins 12, the inner ends of which bear against arms 14 on an oscillatable rod 15 which can be actuated to project the pins through the plate by means of a head 16, extending beyond the end of the plate 10. A stop 17 is fixed to the crown of the dummy plate which engages with the edge of the crown of the arch and determines the longitudinal position of the plate within the arch. In the arrangement shown, this stop is adapted to locate the dummy plate inserted into the arch from the left of Figure 1.

When using the dummy plate just described, the overlay 18 indicated by the dot-and-dash lines in Figure 3 is positioned thereon, for example by registering marks which can be correctly positioned with reference to a centre line on the stop 17 and the pins 11, 12, and secured thereto in the registering position by protruding the pins through the plate and through the overlay.

The dummy plate 10 is then pushed into the arch to the extent determined by the position of the stop 17 and raised within the arch to bring the overlay into close contact with the inner surface thereof. The pins 11, 12, are simultaneously depressed to the inoperative position by contact with the inner surface of the arch. The valve 9 is then closed, and the overlay held in position by the suction thus applied to the holes 4. The dummy plate 10 can then be lowered and removed from the arch 1, leaving the overlay in the latter properly positioned for the plates subsequently to be shaved.

A plate is raised within the arch by upward movement of adjustable rails constituting virtually continuations within the arch of the rails 2, 3, and in certain constructions of apparatus, the edge of the plate which rests on the extension of the rail 2 is raised earlier than the edge which rests on the extension of the rail 3. In order to guard against any displacement of the overlay which might be caused by these movements, the dummy plate is provided along the edge which rests upon the extension of the rail 2 with a laterally extending flange 19 having a resilient covering 20.

The respective edge of the overlay is bent over into contact with the resilient covering 20, and when that edge of the dummy plate is raised into contact with the flat undersurface 21 of the arch 1, pins 22 projecting from that undersurface engage the resilient covering 20 through the edge of the overlay so that the lateral position of the overlay in the arch is maintained during the subsequent raising of the opposite edge of the plate. To assist this action, certain of the holes 4 are preferably located in close proximity to the pins 22.

In the use of a boring mask or cut overlay, one or more of the cut away portions thereof might possibly fall into register with some of the holes 4, thereby weakening the suction applied to parts of the overlay covering the other holes. To avoid this difficulty a safety valve, as illustrated in Figure 6, is preferably provided in each of the branch pipes 5, consisting of a ball 23 normally held by gravity against the lower end of the respective pipe 5, and a seat 24 against which the ball 23 will be drawn, so as to close the pipe in the event of the hole 4 being left uncovered by a cut away portion of the overlay.

It is to be understood that the constructional form of apparatus above described and illustrated in the accompanying drawings is given as a convenient example, and that modifications may be made without departing from the invention. For example, registering and retaining means other than the pins 11, 12, may be employed on the dummy plate, and the valve 9 may be replaced by a valve at some other part of the suction system capable of being adjusted to place the holes 4 under suction when applying and holding the overlay in the arch under air pressure during the removal of the overlay from the arch and opening them to atmosphere when an overlay is not in use.

By the use of the improved apparatus according to the invention, accurate shaving of the plates with relation to any desired relief on the printing surface, is assured without the inconveniences heretofore experienced in the use of overlays and a great saving of time is effected as regards the application of make-ready to the plate cylinders on which the plates are subsequently used for printing.

Having described my invention, I declare that what I claim and desire to secure by Letters Patent is:—

1. In apparatus for shaving curved stereotype plates, the combination with a shaving arch having orifices extending through its crown, of a suction system outside the arch, a pipe connecting each of said orifices with the suction system, and a valve associated with each orifice adapted automatically to close the connection of the respective orifice with the suction system when the latter is operative and the orifice is open to atmosphere within the arch.

2. In apparatus for shaving curved stereotype plates, the combination with a shaving arch having orifices extending through its crown, of a suction system outside the arch, a pipe connecting each of said orifices with the suction system, a valve in the suction system adjustable to open said system to atmosphere, and a valve associated with each orifice adapted automatically to close the connection of the respective orifice to the suction system when the latter is operative and the orifice is open to atmosphere within the arch.

3. In or for apparatus for shaving curved stereotype plates comprising a shaving arch, a dummy plate adapted to occupy within the shaving arch a position corresponding to that of a plate to be shaved, and means adapted to secure in contact with the outer surface of the dummy plate an overlay for a plate to be shaved.

4. In or for apparatus for shaving curved stereotype plates comprising a shaving arch, a dummy plate adapted to occupy within the shaving arch a position corresponding to that of a plate to be shaved, and means manually actuated to secure to the outer surface of the plate an overlay for a plate to be shaved and automatically actuated to release the overlay from the dummy plate when the latter is positioned within the shaving arch.

5. In or for apparatus for shaving curved stereotype plates comprising a shaving arch, a dummy plate adapted to occupy within the shaving arch a position corresponding to that of a plate to be shaved, and retractible pins extending through the plate from the interior thereof and adapted to engage an overlay surrounding the plate.

6. A dummy plate according to claim 3, including a stop for determining the longitudinal position of the plate within the shaving arch.

7. A dummy plate according to claim 3, including a laterally extending flange along one edge provided with a resilient covering.

8. In or for apparatus for shaving curved stereotype plates comprising a shaving arch, a dummy plate corresponding in form to a plate to be shaved and provided with pins retractible by contact with the shaving arch adapted to engage an overlay surrounding the dummy plate, a stop adapted to determine the longitudinal position of the shaving arch, a laterally extending flange along one edge, and a resilient covering for the said flange.

9. In or for apparatus for shaving curved stereotype plates comprising a shaving arch, a dummy plate adapted to be inserted within the arch, said dummy plate corresponding in form with a plate to be shaved and being provided with registering devices adapted to determine the position of an overlay on the dummy plate corresponding to its position with relation to a plate to be shaved.

10. In apparatus for shaving curved stereotype plates, the combination with a shaving arch having orifices extending through its crown of a main suction pipe outside the arch, branch suction pipes connecting said main suction pipe with the orifices, a valve in the main suction pipe adjustable to close and open said pipe to atmosphere, and a valve associated with each orifice adapted automatically to close the respective branch pipe when suction is applied to the open orifice through said branch pipe.

11. The method of preventing distortion of the inner surfaces of a series of duplicate printing plates which consists in supporting an overlay against a surface, placing a printing plate on the overlay, shaving the opposite surface of said plate, removing the plate while leaving the overlay in place, and placing the next plate on the overlay.

12. The method of preventing distortion of the inner surfaces of a series of duplicate printing plates which consists in holding an overlay against a surface by suction, placing a printing plate on the overlay, shaving the opposite surface of said plate, removing the plate while leaving the overlay in place, and placing the next plate on the overlay.

AARON HENRY HOWELL.